No. 833,373.    PATENTED OCT. 16, 1906.
H. DE MOSS.
STALK CUTTER.
APPLICATION FILED FEB. 9, 1906.

2 SHEETS—SHEET 1.

Inventor
H. De Moss.

Witnesses

By
Attorneys

THE NORRIS PETERS CO., WASHINGTON, D. C.

No. 833,373. PATENTED OCT. 16, 1906.
H. DE MOSS.
STALK CUTTER.
APPLICATION FILED FEB. 9, 1906.

2 SHEETS—SHEET 2.

Inventor
H. De Moss.

Witnesses

UNITED STATES PATENT OFFICE.

HENRY DE MOSS, OF STROUD, OKLAHOMA TERRITORY, ASSIGNOR OF ONE-HALF TO A. C. SAMPLE, OF DAVENPORT, OKLAHOMA TERRITORY.

STALK-CUTTER.

No. 833,373.     Specification of Letters Patent.     Patented Oct. 16, 1906.

Application filed February 9, 1906. Serial No. 300,317.

*To all whom it may concern:*

Be it known that I, HENRY DE MOSS, a citizen of the United States, residing at Stroud, in the county of Lincoln, Oklahoma Territory, have invented certain new and useful Improvements in Stalk-Cutters, of which the following is a specification.

This invention embodies improvements in agricultural machines, and relates particularly to that type especially designed for cutting corn and cotton stalks.

The invention involves novel mechanism for adjusting the position of the cutter and the frame of the machine to facilitate passage over obstacles and also other details of construction the advantages for which will appear more fully hereinafter and which will be finally claimed.

For a full description of the invention and the merits thereof and also to acquire a knowledge of the details of construction of the means for effecting the result reference is to be had to the following description and accompanying drawings, in which—

Figure 1:
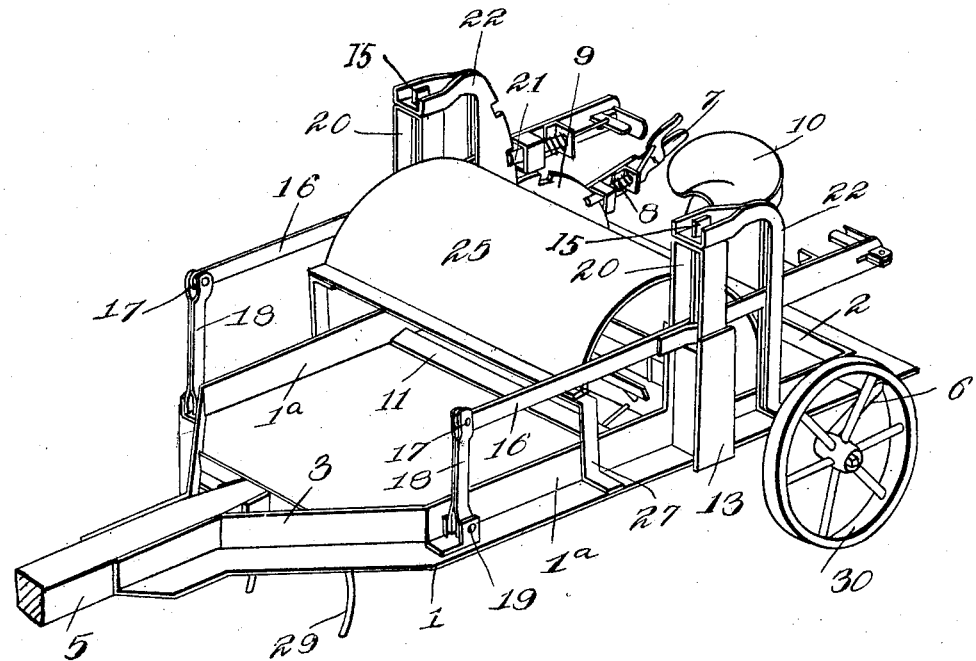
Figure 2:
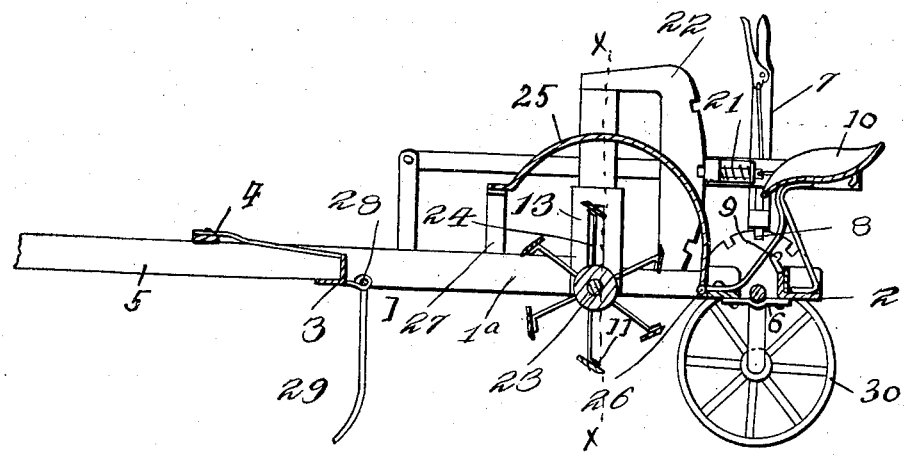
Figure 3:
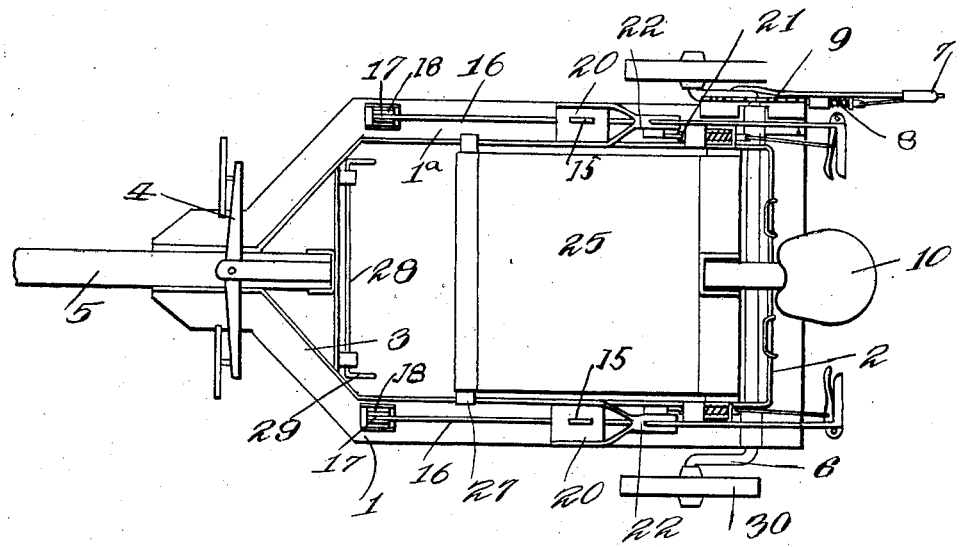
Figure 4:
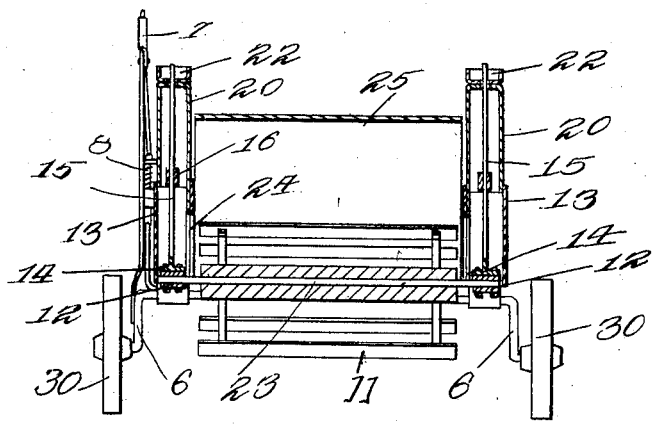

Figure 1 is a perspective view of a machine embodying the invention. Fig. 2 is a longitudinal sectional view. Fig. 3 is a top plan view. Fig. 4 is a transverse section on the line X X of Fig. 2.

Corresponding and like parts are referred to in the following description and indicated in all the views of the drawings by the same reference characters.

In the drawings the numeral 1 designates the frame of the machine, said frame being of somewhat rectangular form comprising the sides 1ª, the rear transverse bar 2, and the front portion 3, which is adapted to support the whiffletree 4 and to which the tongue 5 is attached. The supporting-axle 6 of the frame 1 is of arched form, as customary, and is mounted in suitable bearings in the frame at the rear end thereof. A lever 7 is connected with an end portion of said axle 6 and is provided with a latch 8 to coact with a segment 9, whereby the axle may be adjusted so as to raise and lower the frame 1. A suitable seat 10 is arranged at the rear end of the frame.

A cutter 11 for severing the stalks is mounted intermediate of the ends of the frame 1, being supported by movable bearings 12, which preferably consist of wooden blocks arranged in casings 13, projecting upwardly from the sides 1ª of the frame 1. The bearings 12 are detachable from plates 14, which are movable in the casings 13 and which are secured to the lower ends of vertical rods 15, which pass through the upper ends of the casings 13 and are connected with cutter-adjusting levers 16. The cutter-adjusting levers 16 are pivoted at their front ends, as shown at 17, to bars 18, which in turn are pivoted at 19 to the front end portions of the sides 1ª of the frame 1. The rods 15 connect with the levers 16 intermediate the ends of the latter, the upper ends of said rods being guided in U-shaped standards 20, which project up from the top of the casings 13. The levers 16 are horizontally arranged and are adjustable by means of latches 21, which are adapted to engage notched plates 22, the lower ends of which are attached to the sides 1ª of the frame 1 and the upper ends of which are extended forward and are attached to the upper ends of the standards 20. By adjusting the position of the levers 16 the cutter 11 may be raised or lowered, and it will be obvious that the levers 16 are independently or simultaneously adjusted at the will of the operator. The provision of the bearings 12, which, as before described, are preferably wooden blocks, is advantageous in that the axle 23 of the cutter 11 does not cut the bearings, and if the latter are very much worn they may be quickly detached and new ones supplied at a nominal cost. The inner sides of the casings 13 will of course be provided with vertical slots 24 to permit the axle 23 of the cutter to move up and down. The cutter 11 is of any suitable type and embodies a plurality of cutting-blades adapted to readily engage the stalks in the operation of the machine.

A suitable guard 25 in the form of a cover is arranged above the cutter 11 and consists of a curved plate hinged at its rear end, as shown at 26, to the rear portion of the frame 1. The guard 25 may be readily thrown back to have access to the cutter beneath the same, and the front end of the guard will be supported by vertical arms 27, attached to the sides 1ª of the frame 1, and have lateral extensions on which the front end of the guard is adapted to rest when the latter is in its normal position.

The mounting of the frame of the implement on the axle 6 is such that by operation of the lever 7 the frame may be quickly raised to bodily raise the cutter in passing over small obstacles. If larger obstacles are in the way, the operator can not only raise the frame 1 in the above manner, but he can quickly raise the levers 16 also, and this will carry the cutter 11 upwardly, so that a maximum elevation of the cutter may be secured in an evident manner.

Mounted at the front portion of the frame and carried by a shaft 28 are the drag-hooks 29, which are adapted to operate in advance of the cutter and which will not interfere with the action of the latter in any way whatever. Wheels 30 will of course be applied to the axle 6. The weight of the machine can be readily changed from the cutter 11 to the wheels 30 by operation of the operating-levers which are provided for the several parts.

Having thus described the invention, what is claimed as new is—

1. In a stalk-cutter, the combination of a supporting-frame, a supporting-axle therefor, a cutter, casings projecting upwardly from opposite sides of the frame, bearings for the cutter mounted in said casings, cutter-adjusting levers pivoted to the frame, rods connecting said bearings with the cutter-adjusting levers and projecting upwardly from the casings, guide members supported by said casings to guide the rods aforesaid in their movement, and means for fixing the positions of the cutter-adjusting levers.

2. In a stalk-cutter, the combination of a supporting-frame, a supporting-axle therefor, a cutter, casings projecting upwardly from opposite sides of the frame, bearings for the cutter mounted in said casings, cutter-adjusting levers pivoted to the frame, rods connecting said bearings with the cutter-adjusting levers and projecting upwardly from the casings, guide members supported by said casings to guide the rods aforesaid in their movement, means for fixing the positions of the cutter-adjusting levers, and a guard for the cutter hingedly connected with the rear portion of the frame.

3. In a stalk-cutter, the combination of a supporting-frame, a supporting-axle therefor, a cutter, casings projecting upwardly from opposite sides of the frame, bearings for the cutter mounted in said casings, cutter-adjusting levers pivoted to the frame, rods connecting said bearings with the cutter-adjusting levers and projecting upwardly from the casings, guide members supported by said casings to guide the rods aforesaid in their movement, latch devices for fixing the position of the cutter-adjusting levers, a guard hingedly connected with the rear portion of the frame, and arms applied to the front portion of the frame to support the front end of the guard in operative position.

4. In a stalk-cutter, the combination of a supporting-frame, a supporting-axle therefor, a cutter, casings projecting upwardly from opposite sides of the frame, bearings for the cutter mounted in said casings, cutter-adjusting levers pivoted to the frame, rods connecting said bearings with the cutter-adjusting levers and projecting upwardly from the casings, guide members supported by said casings to guide the rods aforesaid in their movement, latch devices for fixing the position of the cutter-adjusting levers, a guard hingedly connected with the rear portion of the frame, arms applied to the front portion of the frame to support the front end of the guard in operative position, and drag-hooks arranged at the front portion of the frame in advance of the cutter.

In testimony whereof I affix my signature in presence of two witnesses.

HENRY DEMOSS. [L. S.]

Witnesses:
W. G. PARDOE,
J. W. HOCKADAY.